United States Patent
Soga et al.

(10) Patent No.: US 7,181,657 B2
(45) Date of Patent: Feb. 20, 2007

(54) DATA TRANSMISSION APPARATUS ADAPTIVE TO DATA QUALITY ON RADIO-TRANSMISSION AND A METHOD OF DATA TRANSMISSION THEREFOR

(75) Inventors: Mineo Soga, Tokyo (JP); Hiromitsu Miyamoto, Tokyo (JP); Atsushi Kimura, Saitama (JP); Tatsushi Hashimoto, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 579 days.

(21) Appl. No.: 10/669,254

(22) Filed: Sep. 25, 2003

(65) Prior Publication Data

US 2005/0071714 A1    Mar. 31, 2005

(51) Int. Cl.
*G06F 11/00* (2006.01)
(52) U.S. Cl. .................... 714/704; 714/746
(58) Field of Classification Search ........... 455/226.2; 714/708, 748, 751, 774, 704, 746; 370/343, 370/329; 375/132
See application file for complete search history.

(56) References Cited

U.S. PATENT DOCUMENTS

| | | | | |
|---|---|---|---|---|
| 5,001,776 A | * | 3/1991 | Clark | 455/226.2 |
| 5,430,743 A | * | 7/1995 | Marturano et al. | 714/708 |
| 5,835,508 A | * | 11/1998 | Kushita | 714/748 |
| 6,189,123 B1 | * | 2/2001 | Anders Nystrom et al. | 714/751 |
| 6,460,158 B1 | * | 10/2002 | Baggen | 714/774 |
| 6,643,817 B2 | * | 11/2003 | Baggen | 714/774 |
| 6,965,590 B1 | * | 11/2005 | Schmidl et al. | 370/343 |
| 6,970,495 B1 | * | 11/2005 | Schmidl et al. | 375/132 |
| 6,987,955 B1 | * | 1/2006 | Sapozhnykov et al. | 455/127.5 |
| 7,046,644 B1 | * | 5/2006 | Lappetelainen | 370/329 |

FOREIGN PATENT DOCUMENTS

JP    2002290415    10/2002

OTHER PUBLICATIONS

Bluetooth Specification Version 1.1 "Link Manager Protocol" Part C, May 8, 2001, pp. 184-233.

* cited by examiner

*Primary Examiner*—David Ton
(74) *Attorney, Agent, or Firm*—Volentine & Whitt, P.L.L.C.

(57) ABSTRACT

With radio-transmission apparatus, in order to control the rate of packet data transmitted between a master and slaves adaptively to the quality of an RF channel, a slave controls, when having received packet data, error detection to detect a reception error in the packet data. On the basis of the reception error detected, the quality of the packet data transmitted is determined. In response to the resultant quality thus determined, the slave generates a command instructing the master, sending out packet data, to alter a sort of packets to transmit the command to the master. The master alters the sort of packets as instructed by the command.

20 Claims, 5 Drawing Sheets

DATA TRANSMISSION APPARATUS ADAPTIVE TO DATA QUALITY ON RADIO-TRANSMISSION AND A METHOD OF DATA TRANSMISSION THEREFOR

BACKGROUND OF THE INVENTION

1. Field of the Invention

The present invention relates to data transmission apparatus adaptive to data quality on radio-transmission and a method of data transmission for the same, and more particularly, for example, to such apparatus operative on the Bluetooth (trademark) function and such a method of selecting types of packets on the basis of CQDDR (Channel Quality-Driven Data Rate) function on Bluetooth radio-transmission to transfer packets of data.

2. Description of the Background Art

Conventionally, an example of radio-transmission system functioning on the basis of Bluetooth includes one master device and at most seven slave devices communicable with the master device over a link of piconet. On that type of radio-transmission, data are transmitted with the throughput optimized. The optimization of data transmission is presently regulated by the Bluetooth Specification, Ver. 1.1, Part C, pp. 223–224, May 8, 2001. The Specification also regulates the function of CQDDR (Channel Quality-Driven Data Rate). In the CQDDR function, each of the devices receives and measures data packets transmitted on a radio-transmission pass, referred to as an RF (Radio Frequency) channel, to evaluate a transmission quality, from which on the basis of the result the receiver devices request the device which will transmit data packets to selectively control the types of data packets to be transmitted.

On data transmission, an asynchronous connectionless link (ACL) is employed. Generally, two types of packet are selectively transmitted on an ACL link independence upon whether or not to function with ⅔ FEC (Forward Error Correction). The CQDDR function controls a transmitter device to select either of the two types of packet in dependence upon the transmission quality measured to adaptively switch the data rate on the piconet.

Such adaptive switching of a data rate is adopted by a communication device disclosed, for example, by Japanese Patent Laid-Open Publication No. 2002-290415. The communication device disclosed by the Japanese publication works on the Bluetooth so that audio signals may be dealt with in the form of SCO (Synchronous Connection Oriented) packets to establish communications. For that application, types of packets available include HV1, HV2 and HV3 packets.

Those packets regulated will briefly described. Basically, SCO packets are not re-transmitted. An HV1 packet includes only a payload body, in which ten bytes of user data are included. The 10-byte data do not include an error correction code under the cyclic redundancy check (CRC) system. Instead, data are error-correction-encoded at ⅓ rate, i.e. encoded on Rate ⅓ FEC (Forward Error Correction), to ultimately assemble the packets having the payload length of 30 bytes, i.e. 240 bits. An HV2 packet includes 20 bits of user data. Data are error-correction-encoded at ⅔ rate, i.e. encoded on Rate ⅔ FEC. An HV3 packet includes 30 bits of user data, and not an error correction code.

Under the Bluetooth Specification, various types of transmission packets are regulated. It is however not regulated which types of packets are selected under which conditions. The telecommunications apparatus exemplified above are desirous to establish, with the Bluetooth Specification satisfied, transmission most appropriate for a telecommunications environment as well as minimum consumption of transmission power. The exemplified telecommunications apparatus are adapted to set up an HV3 packet when commencing transmission, to detect the frequency of transmission errors encountered in a unit period of time during communication, and to select an HV2 or an HV3 packet adaptively to the detected frequency so as to satisfy the requirements regulated to continue transmission.

The Bluetooth Specification also regulates packets to be transmitted on the ACL link. Nothing is however regulated on how to measure, in a piconet established, the quality of an RF channel at slave devices which are going to receive packets, nor a quality standard for use in controlling, in accordance with a result from the measurement, a master device, i.e. a remote device, to select an appropriate type of packets. This in practice renders designers' discretion specific for Bluetooth devices designing the detailed specifications of the CQDDR function stated earlier.

Devices receiving data have in fact a CQDDR function for general purpose measuring errors in received data on the basis of the Bluetooth Specification to compare a measurement with a predetermined threshold to determine how the quality of data transmission is. When a device receiving data often detects an error frequency falling in the vicinity of the threshold, it issues a message requesting a remote device for switching the type of packets to another. This results in increasing a data transmission rate on the piconet so as to enhance the data throughput on that remote device.

SUMMARY OF THE INVENTION

It is an object of the present invention to provide data transmission apparatus adaptive to data quality on radio-transmission which is improved in throughput on data transmitted from a master device with the data quality maintained.

It is another object of the invention to provide a method of data transmission improved in throughput on data transmitted from a master device with the data quality maintained.

In accordance with the present invention, apparatus for transmitting data on radio waves between a master and at least one slave and controlling a rate of packet data transmitted between the master and the at least one slave adaptively to quality of an radio frequency (RF) channel comprises a controller for controlling error detection in packet data transmitted on the radio waves, a quality determining section for determining the quality of the packet data transmitted on a basis of an error detected, and a command generator responsive to a result from determination of the quality of the packet data for generating a command indicating an alteration of a sort of the packet data to send out the command toward a source party having transmitted the packet data.

The apparatus may advantageously further comprises an altering section responsive to the command generated for altering the sort of packet data in complying with the command.

In accordance with the invention, in order for radio-transmission apparatus to control the rate of packet data transmitted between a master and slaves adaptively to the quality of an RF channel, a controller controls error detection in the packet data, and a quality determining section determines the quality of packet data received on the basis of a reception error detected. The instruction generator is responsive to the resultant quality thus determined to generate a command instructing alteration of a sort of packets to transmit it to a party having transmitted the packet data. The altering section, when having received the command, alters the sort of packets as instructed by the command. This allows the circumstances to be accomplished, where the frequency of errors encountered with the deterioration of packet data transmitted is assumed more than what is encountered when improved, and not a command altering the packet type to be issued frequently in the quality in the vicinity of a threshold set, thus resulting in improvement of the throughput of data on a master device.

Further in accordance with the invention, a method of transmitting data on radio waves between a master and at least one slave comprises a first step of establishing a connection between the master and the at least one slave, a second step of transmitting, following said first step, from the master to the at least one slave a first command setting to a predetermined value a rate of the packet data according to a link manager protocol regulated in Bluetooth, a third step of receiving the first command by the at least one slave, a fourth step of starting, upon having received the first command, detecting an error, a fifth step of transmitting, following said fourth step, purely the packet data from the master to the at least one slave, a sixth step of measuring an accumulated number of errors detected in a period of time for detecting an error as a total number of slots for reception error, where a length of the packet data received by the at least one slave is represented by a number of slots, the period of time being set as an accumulated number of slots, a seventh step of comparing the total number of slots of reception error with a predetermined, first threshold defining deterioration of the packet data on transmission to determine the deterioration of quality of the packet data in dependence upon whether or not the total number of slots is detected equal to or exceeding the first threshold, an eight step of instructing, in dependence upon a result from determination of the deterioration, the master from the at least one slave to alter a type of packet, a ninth step of determining whether or not an error correction code is to be attached to the type of packet presently set in response to alteration of the type of packet, and a tenth step of controlling alteration of the type of packet in the packet data to be transmitted from the master to the at least one slave, whereby a rate of packet data transmitted between the master and the at least one slave is controlled adaptively to quality of an radio frequency (RF) channel.

Still further in accordance with the invention, a method of transmitting data on radio waves between a master and at least one slave comprises a first step of establishing a connection between the master and the at least one slave, a second step of transmitting, following said first step, from the master to the at least one slave a first command setting to a predetermined value a rate of the packet data according to a link manager protocol regulated in Bluetooth, a third step of receiving the first command by the at least one slave, a fourth step of starting, upon having received the first command, detecting an error, a fifth step of transmitting, following said fourth step, purely the packet data from the master to the at least one slave, a sixth step of measuring an accumulated number of errors detected in a period of time for detecting error as a total number of slots for reception error, where a length of the packet data received by the at least one slave is represented by a number of slots, the period of time being set as an accumulated number of slots, a seventh step of comparing, when an error correction code has been attached to the packet data by the at least one slave, the total number of slots of reception error with a predetermined, first threshold defining improvement of the packet data on transmission to determine the improvement of quality of the packet data in dependence upon whether or not the total number of slots is detected equal to or below the first threshold, an eight step of instructing, in dependence upon a result from determination of the improvement, the master from the at least one slave to alter a type of packet, a ninth step of determining whether or not an error correction code is to be inhibited from being attached to the type of packet presently set in response to alteration of the type of packet, and a tenth step of controlling alteration of the type of packet in the packet data to be transmitted from the master to the at least one slave, whereby a rate of packet data transmitted between the master and the at least one slave is controlled adaptively to quality of an radio frequency (RF) channel.

In summary, in accordance with the invention, the operation proceeds in such a fashion that, after a connection has been established between a master and a slave, a command is transmitted from the master to the slave to instruct setting of a predetermined rate. In response, the slave commences error detection, and receives pure packet data, i.e. packet data without an error correction code, from the master. The slave carries out error detection on the packet data thus received to determine at least one of deterioration and improvement of the quality. The control proceeds in such a way that the slave instructs the master to alter the type of packets in dependence upon the result from the detection, that it is determined whether or not to perform at least one of the attachment of an error detection code in respect of the deterioration of the quality and the inhibition of an error detection code from being attached in respect of the improvement of the quality, and that the type of packets is altered in response to the result from the determination to transmit the packet data. This may cause the circumstances to be established under which the frequency of errors encountered with the deterioration in quality of packet data transmitted is assumed more than what is encountered when improved. That does not allow a command altering the type of packets to be issued frequently in the quality in the vicinity of a threshold set, thus resulting in improvement of the throughput of data on a master device.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENT

Figure 1:
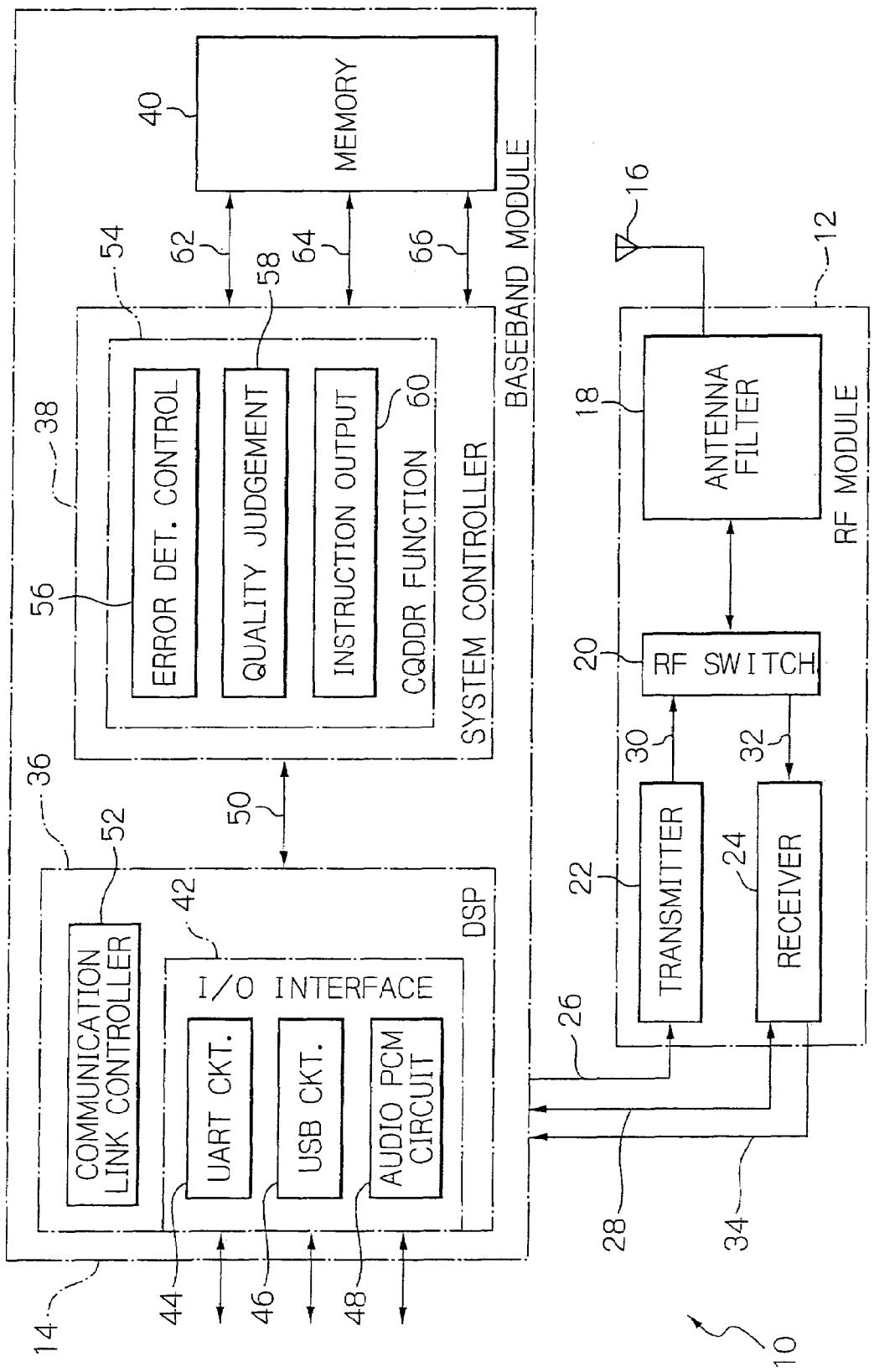
FIG. 1 is a schematic block diagram showing a preferred embodiment of a Bluetooth module to which the present invention is applied.

With reference to FIG. 1, a preferred embodiment of radio-transmission apparatus includes a communication module, i.e. baseband module 10 which has a Bluetooth function and the invention is applied to. Elements not pertinent to understanding the invention will neither be shown nor described in detail.

As illustrated in FIG. 1, the Bluetooth module 10 generally comprises an RF module 12 and a baseband module 14. The RF module 12 includes an antenna 16, an antenna filter 18, an RF switch 20, a transmitter 22 and a receiver 24 interconnected as shown in the figure. The antenna 16 is adapted to be supplied with a signal to transmit it on the radio waves, and to receive radio waves transmitted from others. The antenna filter 18 is a bandpass filter (BPF) adapted to transfer a signal only falling in an industrial scientific medical (ISM) band defined as a regulated frequency. The RF switch 20 switches the Bluetooth module 10 to functioning as a source for supplying a signal or a sink for receiving a signal in dependence upon transmitting or receiving. The illustrative embodiment includes both functions to work as a source, transmitting packet data and a sink receiving packet data. From the viewpoint of the invention, the single Bluetooth module 10 is not necessarily provided with both functions but may be with either of the functions in accordance with the nature of applications.

The transmitter 22, not shown in detail, is adapted for primarily modulating a signal 26 provided from the baseband module 14, and thereafter spreading the spectrum of the signal thus modulated. In the following, signals are specified with reference numerals designating connections on which they appear. The spreading of the spectrum is performed in such a fashion that a series of numerals, referred to as spread code, are multiplied with the primarily modulated signal to thereby spread the spectrum of an original signal to a broader band.

More in detail, prior to the primary modulation, for example, a signal supplied is converted into a corresponding analog signal, which is in turn low-passed to remove a replica and converted into a corresponding digital signal, which will then be frequency-modulated (FM) as the primary modulation. The FM modulation is regulated as Gaussian frequency shift keying (GFSK), in which a carrier frequency is modulated with a modulating data signal thus low-passed with bi-state frequency shift keying (2FSK) or bi-state FSK signal Gaussian-filtered. With the FM modulation, the modulated carrier frequency shifts between a couple of frequencies representing binary "1" and "0", thus rendering one data bit per symbol.

The transmitter 22 is adapted for modulating with the data thus primarily modulated one of the carriers which is periodically selected in response to a frequency hopping (FH) control signal 28, which periodically switches the communication frequency of the receiver 24 at a predetermined time interval, e.g. 625 microsecond, for accomplishing secondarily modulation. As the secondary modulation, the frequency hopping-spread spectrum (FH-SS) system is advantageously applicable, thus switching the carrier frequency upon the time lapsing. Per unit period, eleven carrier frequency channels are switchable so as to hop to a selected channel based upon the spread code. The data thus FM modulated are amplified to be supplied to the RF switch 20 as a source signal 30. The RF switch 20 is controlled to transfer the transmitter frequency signal 30 spread into a broader band to feed the antenna filter 18 therewith.

The receiver 24 has its input port connected from the RF switch 20. The RF switch 20 is adapted to select, when receiving, the receiver 24 as a sink to provide the latter with the signal 32. The receiver 24 is adapted to amplify and band-limit the signal 32. The receiver 24 is adapted for multiplying the band-limited signal with one of the carrier frequencies, of which a spread code is periodically selected in response to the FH control signal 28, for thereby despread-processing. The receiver 24 filters the signal thus multiplied to pass its intermediate frequency (IF) band, and FM demodulates the resultant, filtered signal. With the despread processing, the received signal is multiplied with a code perfectly identical and synchronous with the code used for spreading spectrum at a transmitter to thereby restore the original signal. The FM demodulation thus made is a primary demodulation corresponding to the primary modulation made on the transmitter. The receiver 24 develops the baseband signal 34 resultant from the FM demodulation to the baseband module 12.

The baseband module 14 comprises a digital signal processor (DSP) 36, a system controller 38 and a memory 40 interconnected as depicted in FIG. 1. The digital signal processor 36 is adapted to process various signals and include an input/output (I/O) interface circuit 42. The I/O interface circuit comprises a UART (Universal Asynchronous Receiver/Transmitter) circuit 44, a USB (Universal Serial Bus) circuit 46 and an audio PCM (Pulse Code Modulation) circuit 48 interconnected as shown. The digital signal processor 36 is interconnected to the system controller 38 by a bus 50.

The digital signal processor 36 also includes a communication link controller 52. The communication link controller 52 is adapted to establish a network connection between a master and a slave in synchronous with a pattern of frequency hopping. On the piconet, data transmission is established through the master, and not directly between slaves. To the communication link, an SCO (Synchronous Connection Oriented) link and an ACL (Asynchronous ConnectionLess) link may be applicable. The SCO link is used when dealing with data requiring a real-time connection, such as audio data, while the ACL link is for handling more general data. The communication link controller 52 serves as power saving control, error correction and encryption, etc.

The system controller 38 includes the CQDDR (Channel Quality-Driven Data Rate) function 54, which is one of the characteristic features of the invention. The CQDDR function 54 includes, in addition to the general function in accordance with the LMP (Link Management Protocol), not shown, an error detection control function 56, a quality judgment function 58, and an instruction output function 60. The LMP function cooperates with the communication link controller 52, thus rendering the devices to be interconnected through the link manager.

The error detection control function 56 serves as a slave, which is adapted to be responsive to commencement of error detection from a master and detect errors in a baseband signal 34 received to feed the quality judgment function 58 with a resultant error detection. The quality judgment function 58 is adapted for comparing the error detection thus fed to a predetermined threshold, which is prepared for determining a deterioration in quality, to determine how the quality is on data transmission. The quality judgment function 58 is adapted to, when the device 10 works as a slave, provide the instruction output function 60 with the determination made by the quality judgment function 58. The quality judgment function 58 is also adapted, when the device 10 works as a master, simply not to alter the packet type in dependence upon a command, LMP_PREFERRE-D_RATE, supplied, but determine whether or not alteration is to be made on the packet type presently set.

The instruction output function 60 is adapted for, when the device 10 works as a slave, generating an instruction in response to a resultant determination supplied thereto to transmit the instruction generated to a master. The instruction output function 60 also functions as, when operating on a master, determining whether or not the CQDDR function is enabled and transmitting to a slave packet data associated with an instruction received from the slave. The operation on the link will be described later on in detail.

The memory 40 may advantageously be a flash type of data storage device, in which data are rewritably stored. The memory 40 has connections to the system controller 38 to convey an address 62, data 64 and a control signal 66, effecting data to be stored and read out. The memory 40 includes firmware stored therein, which constitutes a lower layer 72, FIG. 2, in the protocol stack of the Bluetooth hierarchy. The user may load down new firmware, when supplied, into the memory 40 of the Bluetooth module 10 to comply with the specifications, when revised.

Figure 2:
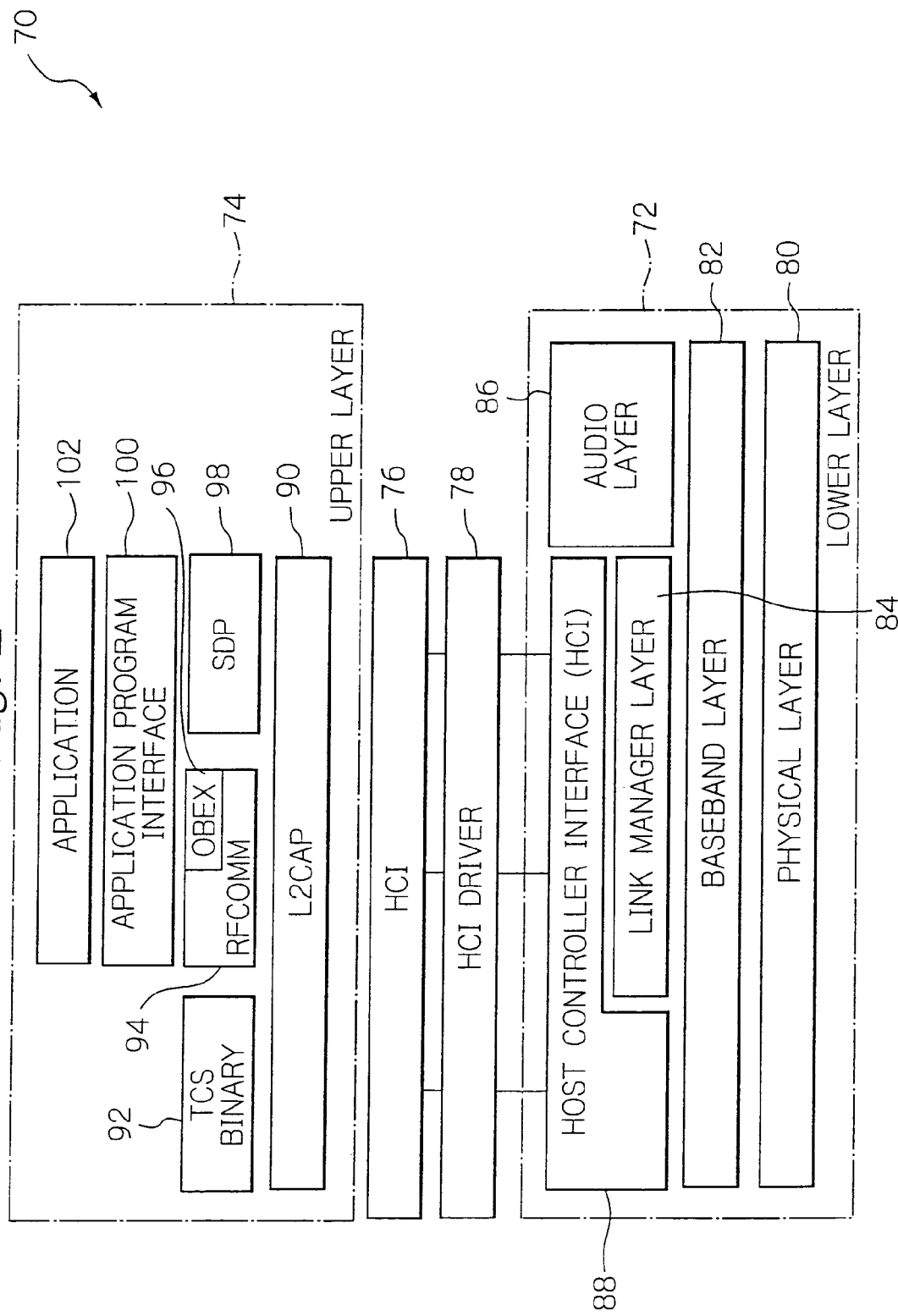
FIG. 2 schematically shows a protocol stack in a Bluetooth system.

Now, a brief reference will be made to FIG. 2, illustrating the protocol stack in the Bluetooth module 10. The protocol stack 70 comprises the lower layer 72 and an upper layer 74. Between both of the layers, a host controller interface (HCI) 76 and HCI driver 78 are disposed for transferring data in between. The HCI driver 78 serves as interconnecting the lower layer 72 to the upper layer 74.

The lower layer 72 is included in the Bluetooth module 10, more specifically in the memory 40 of the host controller. The contents stored in the memory are protocols for a physical layer 80 for RF transmission, a baseband layer 82, a Link Management layer 84, an audio layer 86, and a host controller interface 88. In that connection, applications for controlling the Bluetooth module 10 are referred to as a host. On the host, an upper layer 74, an HCI 76 and an HCI driver 78 are installed.

On the upper layer 74, the hierarchical structure includes an L2CAP (Logical Link Control and Application Protocol) 90, a TCS (Telephony Control profile Specification) binary 92, an RFCOMM 94, an OBEX (OBject EXchange protocol) 96, an SDP (Service Discovery Protocol) 98, an API (Application Program Interface) 100 and an application 102, as depicted in the figure.

More specifically, the L2CAP 90 manages logical channels to unite, detach and assemble the upper and lower layers. The TCS binary 92 is a protocol for implementing cordless telephony. The RFCOMM 94 is a protocol for emulating the COM port, or EIA-232 serial port, of a personal computer. The OBEX 96 is a protocol for utilizing the function of the RFCOMM 94 to transfer and receive data objects, such as calendar and schedule data. The SDP 98 is a protocol for interrogating Bluetooth devices on a piconet on functions and services provided thereby. The API 100 is an interface for allowing protocols to be utilized by application software.

Figure 3:
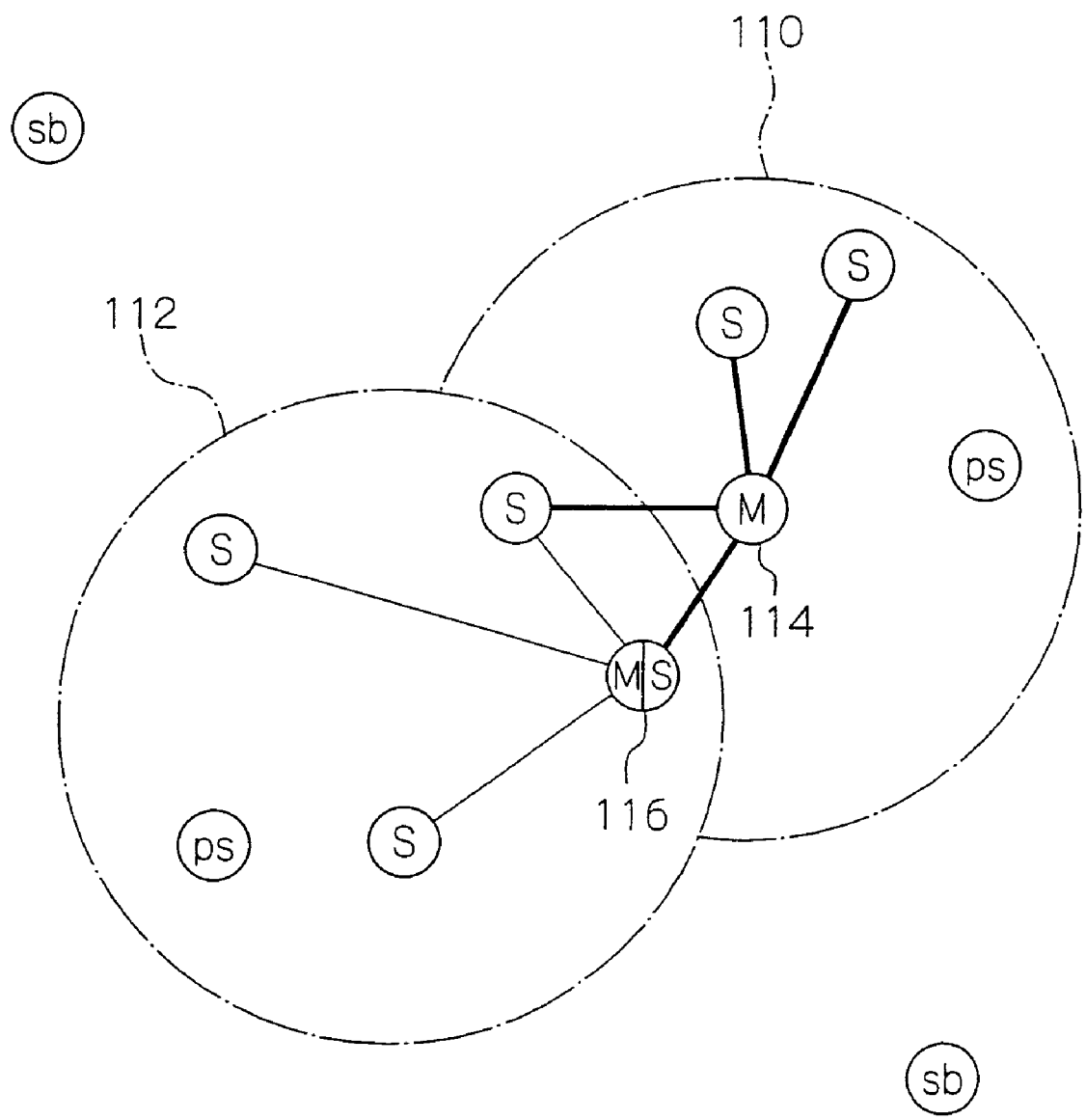
FIG. 3 schematically shows a network topology in the Bluetooth module shown in FIG. 1.

A brief description will be made on a piconet which has a plurality of Bluetooth modules such as module 10 interconnected. The Bluetooth module 10 may serve as either a master or a slave device. As described earlier, a master Bluetooth module M, FIG. 3, may simultaneously establish active communication with at most seven slave Bluetooth modules S. In addition, the Bluetooth module M may have 200 or more slaves registered with those slaves made standby in a power saving mode (ps) without establishing active communication. In an application incorporating such network topology as shown in FIG. 3, control areas allowing the Bluetooth module M and the slaves S to communicate with each other are designated as piconets 110 and 112. The interconnections between the Bluetooth module M and the slaves S on the piconets 110 and 112 are depicted with thick and thin solid lines, respectively. A Bluetooth module sb is, while staying out of the control areas, in its standby mode.

As seen in FIG. 3, the Bluetooth module M (114) on the one piconet 110 may deal with the Bluetooth module M (116) on the other piconet 112 as a slave (S). In FIG. 3, the Bluetooth module 116 is therefore depicted with the letters MS. The piconet 112 thus interconnected is referred to as "scatternet". In the scatternet, control is made on one slave not only by one module, but also by a plurality of masters included in respective piconets different from each other.

The link manager on the piconet will be described with reference to FIG. 4 in connection with transmission operation between the master and the slave. In the sequence shown in FIG. 4, the slave 118 is a device which will receive data, while the master 120 is a remote device which controls the slave 118 to transmit data to the slave 118. The master 120 can establish ACL connections, in addition to the slave 118, to a plurality of slaves as understood from the definition on the piconet.

Figure 4:
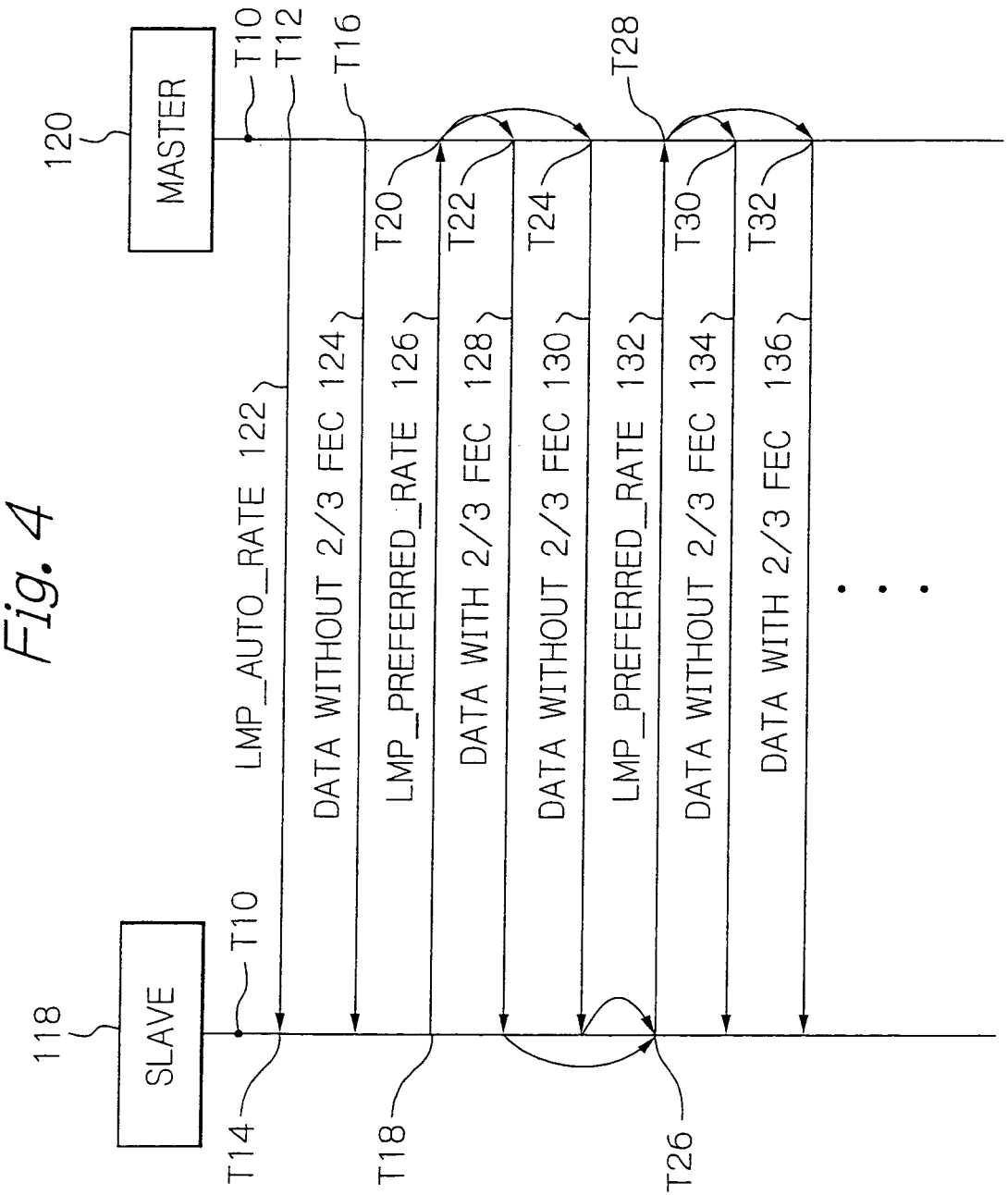
FIG. 4 is a sequential chart useful for understanding the operational procedure of a link manager on piconet transmission performed by the Bluetooth module shown in FIG. 1.

FIG. 4 exemplifies one of the procedures carried out to the respective slaves.

The master 120 and the slave 118 have already set up, not specifically shown in the figure, an ACL connection by means of respective, fundamental commands as of a time T10. Thereafter, in the master 120, the quality judgment function 58 determines whether or not the CQDDR function is effective. The instruction output function 60 transmits, at a time T12, a command, LMP_AUTO_RATE, 122 to the slave 118. When the CQDDR function is determined effective, the initialized contents of the command, LMP_AUTO_RATE, 122 are transmitted, and the master 120 is set to allow the transmission in line with the contents thus transmitted. When the CQDDR function is ineffective, the initialized contents of the command, LMP_AUTO_RATE, 122 are transmitted, and the type of transmission is set excluding error correction codes on data to be transmitted, i.e. the transmission type without ⅔ FEC.

The slave 118 receives, at a time T14, a command, LMP_AUTO_RATE, 122 and starts in response to the command thus received error detection on the data supplied from the error detection control function 56. Not shown specifically, if a data rate for use in altering the packet type with which the master 120 is instructed is initialized to read as, for example, Preferred coding (with or without ⅔ FEC): do not use FEC, and Preferred size (in slots): use 5-slot packets, then the slave 118 designates only the packet size to 5-slot packets, and transmits the corresponding contents to the master 120 with the remaining contents of a data rate neglected even when specified.

The master 120 transmits, at a time T16, data 124 without ⅔ FEC to the slave 118. The slave 118 measures errors in data 124, when received, and determines the degree of deterioration in quality of the data 124. The period of time in which a reception error is measured is represented by a total number of slots corresponding to a sum of the sizes, or lengths, of packets received. The total number of slots does not exceed the number of slots corresponding to the period of time in which the quality deteriorates. The measurement of reception error is controlled by the error detection control function 56. A lapse of the measuring period of time initializes the number of reception errors to null to restart measuring. The resultant measurement will be evaluated by the quality judgment function 58.

The slave 118 in turn determines whether or not the requirements for deterioration of the quality are satisfied on the RF channel. Preferably, the determination is made in a period of time when packet data without ⅔ FEC is supplied since the system is adapted to operate to determine when the quality of packet data is transited from its good to bad state. The requirements for determining the quality are set with several parameters. The parameters may be set by means of vender commands as the user desires. The periods of time in which the quality deteriorates or improves and thresholds are represented by the number of slots. An example of default values thereof will be defined below:

| | |
|---|---|
| threshold of quality deteriorated: | 20 slots, |
| measuring period of quality deteriorated: | 100 slots, |
| threshold for quality improved: | 2 slots, and |
| measuring period of quality improved: | 1000 slots. |

For the determination mentioned above, the slave 118 compares the number of slots, corresponding to the total size or length of packets containing errors detected among the packets involved in a period of time in which data 124 without ⅔ FEC are received, with a predetermined threshold, i.e. the threshold for quality deteriorated. Whenever the total number of error slots is equal to or exceeds the threshold, a deterioration in quality is determined to transfer a resultant determination to the instruction output function 60. The slave 118 transmits, at a time T18, the command, LMP_PREFERRED_RATE, 126 from the instruction output function 60 toward the master 120. The command, LMP_PREFERRED_RATE, 126 contains FEC 5-slots initialized as described earlier. The slave 118 resets, after having transmitted the command, LMP_PREFERRED_RATE, 126, counts of reception errors and packets received to null, for restarting measurement. By contrast, when the satisfactory quality is determined, the slave 118 will transmit nothing. Data transmission continues at the present transmission rate, thus continuing measuring reception errors.

In the master 120, at a time T20, the CQDDR function 38 determines whether or not the command, LMP_PREFERRED_RATE, 126 has been received. When the master 120 receives the command, LMP_PREFERRED_RATE, 126, it changes its control to transmit, instead of the presently set packet type, packet data 128 with ⅔ FEC, which will in turn be transmitted to the slave 118 at a time T22. When the master 120 fails to receive the command, LMP_PREFERRED_RATE, 126 in a predetermined period of time since the time T20, it determines to continue the data transmission with the satisfactory quality without altering the packet type on transmission, and transmits packet data 130 without ⅔ FEC at a time T24. The slave 118 continues the connection with the master 120 to measure errors against the deterioration of quality on the packet data 128 and 130 received, regardless of with or without ⅔ FEC.

The slave 118 thus continues the connection with the master 120 to measure reception errors in the data received. At a time T26, the slave 118 determines from measurements how the quality improves in respect of packet data 128 and 130 received. That determination may preferably be made while packet data with ⅔ FEC are received since the system is adapted to determine a transition from a worse to a better condition on packet data. In this exemplified application also, the period of time for measuring reception errors are defined by the number of slots corresponding to the total size of the packets received, and the total number of slots is made not exceeding the number of slots corresponding to the period of time during which the quality becomes improved. The measurement of reception errors is controlled by the error detection control function 56, so that a lapse of the period of time for measuring reception errors causes a count of reception errors to be reset to its initialized value, or zero, to restart error measurement. Resultant measurements will be evaluated by the quality judgment function 58.

The slave 118 in turn determines whether or not the conditions of improved quality on the RF channel are satisfied. For this aim, the slave 118 compares the number of slots, corresponding to the total size of packets including errors detected among the packet data involved in a period of time in which the packet data are received, with a predetermined threshold, i.e. the threshold for quality improved. Particularly, the comparison may preferably be applied to supplied data 128 with ⅔ FEC. If the total number of error slots does not exceed the predetermined threshold, it is then determined that the quality has been improved, a resultant determination being in turn delivered to the instruction output function 60. The slave 118 transmits, at a time T26, a command, LMP_PREFERRED_RATE, 132 from its instruction output function 60 to the master 120. The command, LMP_PREFERRED_RATE, 132 contains the same data as initialized and described above. The slave 118 resets, after having transmitted the command, LMP_PREFERRED_RATE, 132, counts of reception errors and packets received to the initialized values thereof, or zero, to restart error measurement. By contrast, if the slave 118 determines the quality still being worse, then it continues the connection at the rate presently set to measure reception errors.

In the master 120, at a time T28, the CQDDR function 38 determines whether or not it receives a command, LMP_PREFERRED_RATE 132. If the master 120 has received the command, LMP_PREFERRED_RATE, 132, then it sets itself to change the present packet type to the type of packet data 134 without ⅔ FEC to be transmitted, and will transmit at a time T30 the packet data 134 toward the slave 118. If the master 120 fails to receive the command, LMP_PREFERRED_RATE, 132 during a predetermined period of time since the time T28, however, it then determines the data transmission continuing in worse quality to keep the present packet type on transmission so that it transmits packet data 136 with ⅔ FEC at a time T32. The slave 118 continues the connection with the master 120, regardless of with or without ⅔ FEC, to measure errors in case of the deterioration of quality.

The slave 118 will continue to determine whether or not the quality is improved on the basis of resultant measurements of reception errors in a fashion as described above to transmit and receive data to and from the master 120, thus maintaining the link manager for Bluetooth transmission. When a disconnection is made on a party connected over an ACL link, the measurement of reception errors will be stopped with respect to the objects associated with that party.

The operation of the link manager under those conditions may accomplish the circumstances in which the frequency of errors encountered with the deterioration of packet data transmitted is assumed more than what is encountered when improved, thus not allowing a command altering the packet type to be issued frequently in the quality in the vicinity of a threshold set. Especially, the procedure adaptive to the circumstances determines, at times T18, T20, T26 and T30, the quality on transmission between a master and slaves to accomplish improved transmission. More specifically, the determination thus made restrains the slave 118 from producing a control instructing an alteration of the type of packets, giving rise to improvement of the throughput of data on the master 120.

With the illustrative embodiment, both improvement and deterioration of the quality of packet data are controlled in combination on transmitting data. Individual control of either of improvement and deterioration of the quality of packet data can also accomplish the circumstances described above and prevent a frequent alteration of the packet type described above.

Now, the illustrative embodiment may also operate in a way different from what was described above. The sequence flow shown in FIG. 5, similar to FIG. 4, proceeds on the Bluetooth modules M (120) and S (118) disposed in the same way as described with reference to FIG. 4. The control sequence is the same as described with reference to FIG. 4 except that the determinations made by the slave 118 at the times T18 and T26, FIG. 4, are modified and the master 120 accordingly determines of which packet type packets will be transmitted. Like elements are designated with the same reference numerals and redundant description will be avoid. In the sequence flow shown in FIG. 5, set are the same parameters as in FIG. 4.

Figure 5:
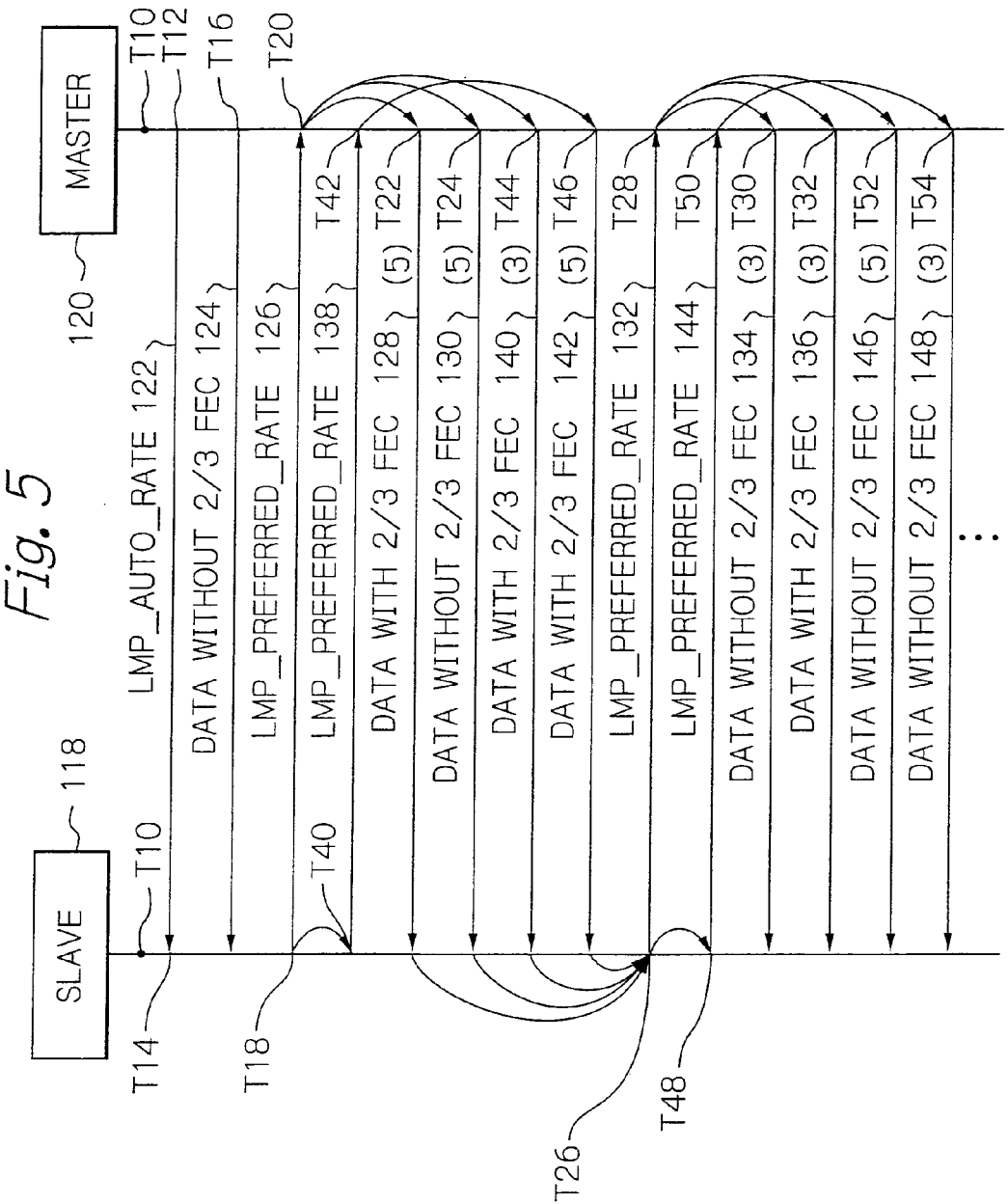
FIG. 5 is also a sequential chart, similar to FIG. 4, useful for understanding another operational procedure of a link manager on piconet transmission performed by the Bluetooth module shown in FIG. 1.

At the time T18, FIG. 5, the quality judgment 58 of the slave 118 measures reception errors and determines the deterioration of quality through two steps. In the first step of determining the deterioration, it is determined whether or not the total number of slots representing the reception errors measured is equal to or exceeds the threshold for quality deteriorated, as in the sequence flow shown in FIG. 4. If the answer is positive or true, then the control advances to the second step of determining the deterioration. By contrast, if the answer is negative or false, then the slave 118 does not issue a command but continues to measure the reception errors. In the second step of the determination of deterioration, it is determined whether or not the transmission condition has become worse. The criterion therefor is twice as high as the threshold for the quality deteriorated, represented by the total number of slots corresponding to errors. The quality judgment 58 provides the instruction output 60 with the results from those two steps of the determination of deterioration.

The instruction output 60 receives the results from the two determination steps and determines on the basis thereof how the data transmission conditions are to issue a command appropriate for the conditions thus determined. If the results from the first and second steps of the determination of deterioration are positive and negative, respectively, then 5-slot packets are used to provide the master 120 with the command, LMP_PREFERRED_RATE, 126 for instructing the change of the packet type, as with the sequence flow shown in FIG. 4. If the results from both the first and second steps of determination of deterioration are positive, however, 3-slot packets are then transmitted at a time T40 to the master 120 which include the command, LMP_PREFERRED_RATE, 138 for instructing the change of the packet type. When the result from the first step of the determination of deterioration is negative, the instruction output 60 then issues nothing to the master 120.

The CQDDR function 38 of the master 120 is, upon receiving the command, LMP_PREFERRED_RATE, 126 at the time T20, notified of the deterioration of the quality of packet data to alter the packet type on transmission. The alteration of the packet type also effects accordingly on the packet size contained therein. The master 120 transmits, at the time T22, packet data 128 in the form of 5-slot packets with ⅔ FEC toward the slave 118. In FIG. 5, the number of slots of a packet is indicated with a numeral enclosed by parentheses above a horizontal line. When the CQDDR function 38 has not received the command, LMP_PREFERRED_RATE, 126 during a predetermined period of time, the master 120 determines data transmitted in a satisfactory quality, and transmits packet data 130 in the 5-slot packet size without ⅔ FEC at a time T24 without changing the type of packets to be transmitted.

At a time T42, when the master 120 receives a command, LMP_PREFERRED_RATE, 138 by the CQDDR function 38, it determines the quality of the packet data in the worst conditions to change the type of packets to be transmitted. The change of the packet type also effects accordingly on the packet size contained therein. Specifically, the master 120 transmits, at a time T44, packet data 140 in the form of 3-slot packets with ⅔ FEC to the slave 118. There may be a circumstance where, even while the CQDDR function 38 has not received the command, LMP_PREFERRED_RATE, 138 during the predetermined period of time, the slave 118 transmits the command, LMP_PREFERRED_RATE, 126 due to the two steps of the determination described earlier. In such a case, the master 120 determines that the data are transmitted under the conditions deteriorated to the extent as with the time T22, so that at a time T46 it changes the type of packets to be transmitted and transmits the packet data 142 with ⅔ FEC having the packet size of 5-slot packets.

The slave 118 receives packet data provided from the master 120, and in turn measures reception errors to determine at the time T26 whether or not the conditions of the quality improved on the RF channel are satisfied. In this determination also, the slave 118 proceeds to the two steps of measuring the reception errors and determining the improvement of quality by the quality judgment 58. In the first step of determining improvement, it is determined whether or not the total number of slots measured as reception errors is equal to or blow the threshold for improvement of quality. If the answer is positive, then the control proceeds to the second step of determining improvement. By contrast, if the answer is negative, the slave 118 then issues no command but continues to measure reception errors. The second step of determining improvement is made on whether or not the total number of slots corresponding to errors is equal to or below a value equal to the half of the threshold for quality improved. The quality judgment 58 supplies the instruction output 60 with the results from those two steps.

In the slave 118, the instruction output 60 determines the conditions of the data transmission on the basis of the results from the two steps of the determination of improvement, and issues a command accordingly to the conditions thus determined. If the results from the first and second steps of the determination of improvement are positive and negative, respectively, then the change of the packet type is instructed in dependence upon whether or not the packet data supplied during the measurement include ⅔ FEC. More specifically, if the packet data includes ⅔ FEC, the packet type is changed to the type without an error correction code with the packet size maintained as 3-slot packets. The slave 118 provides the master 120 with a command, LMP_PREFERRED_RATE, 132 designating that packet type. If the results from both the first and second steps of the determination of improvement are positive, then the packet size is designated to 5-slot packets to change the type without an error correction code. The slave 118 supplies the master 120 with a command, LMP_PREFERRED_RATE, 144 which specifies that packet type. When the result from the first step of the determination of improvement is negative, the instruction output 60 then issues nothing to the master 120.

In the master 120, the CQDDR function 38 determines, when having received a command, LMP_PREFERRED_RATE, 132 at the time T28, the improvement in quality of the packet data to cause the type of packets to be transmitted to be altered. The master 120 transmits, at a time T30, packet data 134 in the form of 3-slot packets without ⅔ FEC to the slave 118. If the CQDDR function 38 has not received the command, LMP_PREFERRED_RATE, 132 for the predetermined period of time, then the master 120 determines that the data are transmitted in a bad condition, the packet type to be transmitted at a time T32 is not changed to transmit the packet data 136 in the form of 3-slot packets with ⅔ FEC.

At a time T50, in the instant example, the CQDDR function 38 of the master 120 receives a command, LMP_PREFERRED_RATE, 144 and determines the packet data are improved in quality extensively to alter the type of packets to be transmitted. The alteration of the packet type also effects correspondingly upon the packet size contained therein. Specifically, the master 120 transmits, at a time T52, packet data 146 in the form of 5-slot packets without ⅔ FEC to the slave 118. In the master 120, when the CQDDR function 38 has not received a command, LMP_PREFERRED_RATE, 144 for a predetermined period of time since the time T50, the master 120 determines the data being transmitted under bad conditions in quality as with the time T28. The slave 118 may transmit the command, LMP_PREFERRED_RATE, 132 depending upon the two steps of the determination described above. In that case, the master 120 determines that data are transmitted in a condition as bad as at the time T28, to change the type of packets to be transmitted at the time T54. The packet data 148 are transmitted of the type of 3-slot packets in packet size without ⅔ FEC.

The slave 118 will continue to determine whether or not the quality is improved on the basis of resultant measurements of reception errors in a fashion as described above to continue the connection with the master 120, thus maintaining the link manager for Bluetooth transmission. The slave 118 resets, after having received the command, LMP_PREFERRED_RATE, counts of received errors and received packets to predetermined values, or zero, thus proceeding to further measurement of reception errors. When a disconnection is made on a party connected over the ACL link, measurement of reception errors will be finished with respect to the objects associated with that party.

The operational sequence described above may accomplish the circumstances, as accomplished with the sequence shown in and described with reference to FIG. 4, thus not allowing a command altering the packet type to be often issued in the quality around a threshold set. The determination thus made restrains the slave 118 from producing a control instructing an alteration of the type of packets, giving rise to improvement of the throughput of data on the master 120.

Additionally, when the quality on an RF channel becomes remarkably worse, the slave 118 requests the master 120 to use the type of shorter packets. When the quality improves significantly, the slave 118 requests the master 120 to use the type of longer packets. In accordance with the requests, the master 120 controls the packet data in terms of amount to transmit the data. This causes the master 120 to enhance the throughput of data.

The Bluetooth module 10 in accordance with the illustrative embodiment may advantageously be applied to short-distance wireless communications, or mobile, devices, such as personal digital assistants (PDAs), which may be involved in the circumstances subject to drastically erratic quality of radio-transmission.

The illustrative embodiment is structured to determine how the quality of transmitted packet data is, on the basis of reception errors obtained through error detection, and to generate and send out a command for changing the sort of packets to a source of the packet data accordingly to the resultant determination on the quality. The source of the packet data alters the sort of packets in dependence upon the sort of packet thus notified. The circumstances are accomplished, where the frequency of errors encountered with the deterioration of packet data transmitted is assumed more than what is encountered when improved. That does not allow a command altering the packet type to be issued frequently in the quality in the vicinity of a threshold set, thus resulting in improvement of the throughput of data on a master device.

With the embodiment of the Bluetooth module 10, the slave 118 requests the master 120, when the quality on an RF channel becomes remarkably worse, to use the type of shorter packets, and in response the master 120 controls the packet data to be transmitted in terms of amount accordingly to the request. That will increase the throughput of data on the master 120.

As described above, both improvement and deterioration of the quality of packet data may be controlled in combination on transmitting data. Alternatively, individual control of either of improvement and deterioration of the quality of packet data can also accomplish the circumstances described above. This prevents a frequent issuance of the packet type altering command as discussed above, and increases the throughput of data on the master.

In order to enhance throughput of data, the slave 118 may advantageously request the master 120 to use the type of shorter packets when the quality on an RF channel remarkably becomes worse and to use the type of longer packets when the quality is remarkably improved.

While the present invention has been described with reference to the particular illustrative embodiment, it is not to be restricted by the embodiment. It is to be appreciated that those skilled in the art can change or modify the embodiment without departing from the scope and spirit of the present invention.

What is claimed is:

1. An apparatus for transmitting data on radio waves between a master and at least one slave and controlling a rate of packet data transmitted between the master and the at least one slave adaptively to quality of an radio frequency (RF) channel, comprising:

a controller for controlling error detection in packet data transmitted on the radio waves;

a quality determining section for determining the quality of the packet data transmitted on a basis of an error detected; and a command generator, responsive to a result from determination of the quality of the packet data, for generating a command indicating an alteration of a sort of the packet data and sending out the command toward a source party having transmitted the packet data; and an alternating section responsive to the command generated for altering the sort of packet data in complying with the command, said controller controlling a start and an end of the error detection as well as measurement of the error detection in a period of detection time represented by a total number of slots accumulated in respect of the packet data supplied.

2. The apparatus in accordance with claim 1, wherein said quality determining section compares the total number of slots obtained in the period of detection time with a predetermined, first threshold defining deterioration of the packet data during transmission to determine, upon the total number of slots detected equal to or exceeding the first threshold, the deterioration of the packet data;

said quality determining section comparing the total number of slots with a predetermined, second threshold defining improvement of the packet data during transmission to determine, upon the total number of slots detected not exceeding the second threshold, the improvement of the packet data;

said quality determining section providing said command generator with a result from determination on the deterioration and improvement of the quality.

3. The apparatus in accordance with claim 2, wherein said command generator is responsive to the result from the determination to generate a command instructing the source party to alter a type of packet and send out the command toward the source party.

4. The apparatus in accordance with claim 3, wherein said command generator has a plurality of the first thresholds set which are different from each other and a plurality of the second thresholds set which are different from each other, the determination being made in respect of the plurality of first thresholds and the plurality of second thresholds to allow a size of the packet data to change adaptively to the determination of worst quality and best quality of the packet data on transmission into a shorter size and a longer size, respectively, than a size set presently.

5. The apparatus in accordance with claim 4, wherein said altering section determines whether or not error correction is to be attached to packet data to be transmitted and whether or not the size of the packet data is to be altered, and controls the transmission of the packet data in accordance with a result from determination.

6. The apparatus in accordance with claim 3, wherein said altering section compares, when said apparatus works as the source party, the command supplied from the slave with the type of packet presently set to determine whether or not error correction is to be attached to packet data to be transmitted, and controls the transmission of the packet data in accordance with a result from determination.

7. A method of transmitting data on radio waves between a master and at least one slave, comprising:
   a first step of establishing a connection between the master and the at least one slave;
   a second step of transmitting, following said first step, from the master to the at least one slave a first command setting to a predetermined value a rate of the packet data according to a link manager protocol regulated in Bluetooth;
   a third step of receiving the first command by the at least one slave;
   a fourth step of starting, upon having received the first command, detecting an error;
   a fifth step of transmitting, following said fourth step, purely the packet data from the master to the at least one slave;
   a sixth step of measuring an accumulated number of errors detected in a period of time for detecting an error as a total number of slots for reception error, where a length of the packet data received by the at least one slave is represented by a number of slots, the period of time being set as an accumulated number of slots;
   a seventh step of comparing the total number of slots of reception error with a predetermined, first threshold defining deterioration of the packet data on transmission to determine the deterioration of quality of the packet data in dependence upon whether or not the total number of slots is detected equal to or exceeding the first threshold;
   an eight step of instructing, in dependence upon a result from determination of the deterioration, the master from the at least one slave to alter a type of packet;
   a ninth step of determining whether or not an error correction code is to be attached to the type of packet presently set in response to alteration of the type of packet; and
   a tenth step of controlling alteration of the type of packet in the packet data to be transmitted from the master to the at least one slave,
   whereby a rate of packet data transmitted between the master and the at least one slave is controlled adaptively to quality of an radio frequency (RF) channel.

8. The method in accordance with claim 7, wherein said seventh step additionally determines, when having determined the deterioration of the quality of the packet data, a further deterioration of the quality of the packet data in dependence upon whether or not the total number of slots is determined equal to or exceeding a predetermined, second threshold which is higher than the first threshold.

9. The method in accordance with claim 8, wherein said eighth step generates, when having determined the deterioration of the quality in terms of the total number of slots of reception error exclusively with respect to the first threshold, a second command instructing attachment of the error correction code in the type of packet, and generates, when the total number of slots is measured equal to or exceeding the second threshold, a third command instructing the attachment of the error correction code and the alteration of the type of packet including setting of a shorter size of packet than the type of packet presently set.

10. The method in accordance with claim 9, wherein said tenth step controls the attachment of the error correction code in response to the second command, and controls, in response to the third command, the attachment of the error correction code and shortening of the size of packet to transmit the packet data.

11. The method in accordance with claim 7, further comprising:
   an eleventh step of comparing, following said tenth step, the total number of slots of reception error in the at least one slave with a predetermined, third threshold defining improvement in the transmission of the packet data, to determine the improvement of the quality of the packet data in dependence upon whether or not the total number of slots is detected equal to or below the third threshold;
   a twelfth step of instructing the alteration of the type of packet to be transmitted from the at least one slave in accordance with the determination of the improvement of the quality;

a thirteenth step of determining, in response to the alteration of the type of packet, whether or not to inhibit the error detection code from being attached to the type of packet presently set; and a fourteenth step of controlling the alteration of the type of packet for the packet data to be transmitted from the master to the at least one slave in accordance with a result from determination in said thirteenth step.

12. The method in accordance with claim 11, wherein said tenth step additionally determines, when having determined the improvement of the quality of the packet data, a further improvement of the quality of the packet data in dependence upon whether or not the total number of slots is detected equal to or below a predetermined, fourth threshold which is lower than the third threshold.

13. The method in accordance with claim 12, wherein said twelfth step generates, when having determined the improvement of the quality in terms of the total number of slots of reception error exclusively with respect to the third threshold, a fourth command instructing inhibition of the error correction code from being attached in the type of packet, and generates, when the total number of slots is measured not exceeding the fourth threshold, a fifth command instructing the inhibition of the error correction code from being attached and the alteration of the type of packet including setting of a longer size of packet than the type of packet presently set.

14. The method in accordance with claim 13, wherein said fourteenth step controls inhibition of the error correction code from being attached in response to the fourth command, and controls, in response to the fifth command, the inhibition of the error correction code from being attached and lengthening of the size of packet to transmit the packet data.

15. The method in accordance with claim 11, wherein said twelfth step generates, when having determined the improvement of the quality in terms of the total number of slots of reception error exclusively with respect to the third threshold, a fourth command instructing inhibition of the error correction code from being attached in the type of packet, and generates, when the total number of slots is measured not exceeding the fourth threshold, a fifth command instructing the inhibition of the error correction code from being attached and the alteration of the type of packet including setting of a longer size of packet than the type of packet presently set.

16. The method in accordance with claim 11, wherein said fourteenth step controls inhibition of the error correction code from being attached in response to the fourth command, and controls, in response to the fifth command, the inhibition of the error correction code from being attached and lengthening of the size of packet to transmit the packet data.

17. A method of transmitting data on radio waves between a master and at least one slave, comprising:

a first step of establishing a connection between the master and the at least one slave;

a second step of transmitting, following said first step, from the master to the at least one slave a first command setting to a predetermined value a rate of the packet data according to a link manager protocol regulated in Bluetooth;

a third step of receiving the first command by the at least one slave;

a fourth step of starting, upon having received the first command, detecting an error;

a fifth step of transmitting, following said fourth step, purely the packet data from the master to the at least one slave;

a sixth step of measuring an accumulated number of errors detected in a period of time for detecting error as a total number of slots for reception error, where a length of the packet data received by the at least one slave is represented by a number of slots, the period of time being set as an accumulated number of slots;

a seventh step of comparing, when an error correction code has been attached to the packet data by the at least one slave, the total number of slots of reception error with a predetermined, first threshold defining improvement of the packet data on transmission to determine the improvement of quality of the packet data in dependence upon whether or not the total number of slots is detected equal to or below the first threshold;

an eight step of instructing, independence upon a result from determination of the improvement, the master from the at least one slave to alter a type of packet;

a ninth step of determining whether or not an error correction code is to be inhibited from being attached to the type of packet presently set in response to alteration of the type of packet; and a tenth step of controlling alteration of the type of packet in the packet data to be transmitted from the master to the at least one slave, whereby a rate of packet data transmitted between the master and the at least one slave is controlled adaptively to quality of an radio frequency (RF) channel.

18. The method in accordance with claim 17, wherein said seventh step additionally determines, when having determined the improvement of the quality of the packet data, a further improvement of the quality of the packet data in dependence upon whether or not the total number of slots is determined equal to or below a predetermined, second threshold which is higher than the first threshold.

19. The method in accordance with claim 18, wherein said eighth step generates, when having determined the improvement of the quality in terms of the total number of slots of reception error exclusively with respect to the first threshold, a second command instructing inhibition of the error correction code from being attached in the type of packet, and generates, when the total number of slots is measured equal to or below the second threshold, a third command instructing the inhibition of the error correction code from being attached and the alteration of the type of packet including setting of a longer size of packet than the type of packet presently set.

20. The method in accordance with claim 19, wherein said tenth step controls inhibition of the error correction code from being attached in response to the second command, and controls, in response to the third command, the inhibition of the error correction code from being attached and lengthening of the size of packet to transmit the packet data.

* * * * *